United States Patent
Rumph et al.

(10) Patent No.: US 7,612,912 B2
(45) Date of Patent: *Nov. 3, 2009

(54) METHOD FOR PREPRESS-TIME COLOR MATCH VERIFICATION AND CORRECTION

(75) Inventors: David E. Rumph, Pasadena, CA (US); Terry C. Wells, Long Beach, CA (US)

(73) Assignee: Xerox Corporation, Norwalk, CT (US)

( * ) Notice: Subject to any disclaimer, the term of this patent is extended or adjusted under 35 U.S.C. 154(b) by 660 days.

This patent is subject to a terminal disclaimer.

(21) Appl. No.: 11/178,106

(22) Filed: Jul. 8, 2005

(65) Prior Publication Data

US 2007/0008558 A1    Jan. 11, 2007

(51) Int. Cl.
  *G06F 15/00* (2006.01)
  *G06K 1/00* (2006.01)
  *H04N 1/60* (2006.01)

(52) U.S. Cl. .......................... 358/1.9; 358/1.6
(58) Field of Classification Search .................. 358/1.9, 358/1.13, 1.15, 462, 504, 518; 395/109; 382/175, 176
See application file for complete search history.

(56) References Cited

U.S. PATENT DOCUMENTS

| | | | | |
|---|---|---|---|---|
| 5,579,446 A | * | 11/1996 | Naik et al. | 358/1.9 |
| 5,872,895 A | * | 2/1999 | Zandee et al. | 358/1.9 |
| 6,757,071 B1 | * | 6/2004 | Goodman et al. | 358/1.13 |
| 2002/0181017 A1 | * | 12/2002 | Such et al. | |
| 2003/0007191 A1 | * | 1/2003 | Herbert | 358/462 |

OTHER PUBLICATIONS

U.S. Appl. No. 11/178,129, filed Jul. 8, 2005, Thomas C. Rich, et al.
U.S. Appl. No. 11/178,017, filed Jul. 8, 2005, Patrick R. Harrington, et al.
U.S. Appl. No. 11/299,121, filed Jul. 8, 2005, Reiner Eschbach.

* cited by examiner

*Primary Examiner*—Douglas Q Tran
(74) *Attorney, Agent, or Firm*—Pillsbury Winthrop Shaw Pittman LLP (57) ABSTRACT

A method of identifying color mismatches for objects having different rendering intents within a print job prior to printing, includes identifying all objects within the print job, each object's type, rendering intent and all source colors associated with it; for each object in the print job, transforming each object's source colors using a prototypical color transformation; identifying sets of transformed objects having source colors that match within a first tolerance; transforming all transformed objects using a target printer's color space; identifying any of the transformed objects in each set that do not match within a second tolerance level; identifying any object types within the group of mismatched objects having at least two different rendering intents; selecting one of the rendering intents in accordance with a predetermined criterion; and assigning the selected rendering intent to at least one other instance of that object type.

8 Claims, 5 Drawing Sheets
(5 of 5 Drawing Sheet(s) Filed in Color)

This is text

This is text

This is text

This is text

This is text

FIG. 6

METHOD FOR PREPRESS-TIME COLOR MATCH VERIFICATION AND CORRECTION

CROSS-REFERENCE TO RELATED APPLICATIONS

This application is related to co-pending, co-assigned U.S. patent applications Ser. No. 11/178,129 to David E. Rumph et al. for "Method for Prepress-time Color Match Verification and Correction," Ser. No. 11/178,017 to Patrick R. Harrington et al. for "Method for Remote Proofing of DFE Color Architecture," and Ser. No. 11/299,121 to Reiner Eschbach, for "Method for Prepress-time Color Match Verification and Correction" filed the same date.

BACKGROUND

This disclosure relates to methods for pre-press color match verification and correction. Color management provides the tools to reconcile the different color capabilities of monitors, scanners, printers and printing presses to ensure consistent color throughout the production process. Color management also allows digital proofing, which is especially important now that more and more presses are run CTP (Computer To Plate) without actually generating film. Color management is based on color spaces. The range of colors, or gamut, perceived by the human eye, captured on film, displayed on a computer monitor, or rendered by a printer vary significantly. Each has its own color space, a mathematical means of describing its colors. RGB is an additive color space that combines red, green and blue light to create all other colors. RGB color spaces are used by monitors, digital camera and scanners. CMYK color, on the other hand, is a subtractive color space using cyan, magenta, yellow and black inks on paper to absorb red, green and blue light. The remaining reflected light is the color perceived by the viewer.

Both RGB and CMYK color are device dependent color spaces; i.e., the colors rendered depend on the device that produces the colors. The colors produced by a scanner vary from a monitor since a scanner uses a CCD (charge coupled device) array to capture colors, while a monitor produces colors from light-emitting phosphors. Additionally, converting an image from RGB to CMYK generally compresses the colors into a smaller gamut. To complicate matters more, the CMYK color space of one printer can vary significantly from the CMYK color space of another printer. As the graphic below shows, the colors reproducible by different mediums varies significantly.

ICC (International Color Consortium) profiles are frequently used to manage color between devices. An ICC profile is a computer file that describes the color capabilities and the color space of a particular monitor, a scanner, a printer, a printing press or a color proofing device. ICC-based color management relies on two things: device profiles, which characterize how individual devices produce color, and a color engine (also called a color matching module or CMM), which reads those profiles and translates and corrects colors between devices. ICC-based color management relies on a color space, called CIELab (or LAB), to arbitrate between the color spaces of different devices. LAB color space is based on the way the human eye perceives color and is device independent. A LAB color engine translates RGB, CMYK and other color spaces to and from LAB, which acts as an interpreter between those color spaces.

Most electronic documents to be printed or output on a particular device include multiple elements, such as text, photos, graphics and the like. Many electronic documents are a composite of other smaller documents and elements. For example, photos may be pasted into a largely text document at different locations. Color graphics and monochrome images may occur on the same page. The individual elements of an electronic document that are intended to match in color may be represented in a variety of color spaces, a situation which for example may arise because those elements are derived from prior documents of differing origins. This situation may not be immediately apparent to the user, because the colors of the objects appear to match on the display or when printed using a straightforward color transformation process, such as is typical in ICC-based color management.

One problem arises when more sophisticated color transformation is involved, such that different source color definitions take different color transformation paths. For example, if one object's color is specified in sRGB, and another object's color specified in SWOP (Specifications for Web Offset Publications) CMYK, the color processing needed to produce the device CMYK for the specific marking process may produce a different device CMYK value for the two objects. This may be due to differing black generation/black preservation strategies, even if the two objects would have matched exactly on a SWOP press (where no conversion of the SWOP CMYK would have been necessary).

Another problem arises when more sophisticated color transformation is involved, such that non-color differences in the source (e.g., differing object type) that cause the objects to take different color transformation paths. One instance of this is that the Xerox Corporation DocuSP color DFE (digital front end) can assign different ICC rendering intents to different object types. For example, by default text is assigned a "Saturation" rendering intent, while graphics are assigned a "Relative Colorimetric" rendering intent. Especially for colors near the edge or outside the printer's color gamut, the processing of the source color may produce visibly different results. Consider, for example, a print job consisting of three characters printed in a first color on a white background adjacent to three characters printed in white on a background of the first color. Using a program such as Adobe Acrobat, the first color would be displayed on a monitor for a user to view. When the job is printed using the DocuSP's color processing, the first color is slightly different.

These situations are difficult to find prior to printing without a very detailed and precise understanding of the DFE's color processing, which the typical user does not have. Consequently, color matching differences of these types have typically been discovered only upon printing, when resolution is costly and time-consuming. What is needed is a method of automatically correcting these problems. Additionally, what is needed is a method which alerts a user to color mismatch problems prior to printing and allows the user to correct any mismatches.

Proofing is a convenient means of providing a user, especially a remote user of a preview of how a particular print job will appear when printed on the selected printer. Currently, there are no color transformation utilities that mimic a DFE's color architecture remotely, i.e., independently of the production rip. Proofing color transforms are typically performed via an output ICC profile for a target printer used as a CMYK source profile on the DFE driving a proofer. Unfortunately, the target ICC profile can only characterize one print condition for CMYK image objects, and fails to correctly model any sophistication in the color processing of the target printer beyond the simple ICC workflow. What is needed is a remote proofing method for displaying a proof of a print job that reflects the remote printer's architecture.

SUMMARY

Disclosed in embodiments herein is a method of color match verification, which may be implemented as a software tool operating on a computer or microprocessor, applied prior to printing that identifies color match problems arising from different color processing for different source color representations and provides a way to either automatically correct these color match problems, or in the alternative, provides a way for a user to correct them. The method accomplishes this by transforming each object's source color using a prototypical color transformation, identifying sets of objects having colors that match using the prototypical process, and then reconverting the source colors using the actual color transformation processing of the selected output device, and ensuring that the objects' colors still match. If they do not, in one embodiment, color matching may be performed automatically using a predetermined criterion. Alternatively, the mismatching colors may be displayed in a user interface that can be used to enable a user to manually update the source color definitions of the various objects so that they are specified in the same way, and therefore will match when printed.

A computer-implemented method of matching color elements for objects having different source color definitions within a print job prior to printing, according to one embodiment includes identifying all source colors to be printed within the print job and object type associated with each instance of a source color; identifying any source colors having at least two different source color definitions; for each source color having at least two different source color definitions, selecting one of the source color definitions in accordance with a predetermined criterion; and assigning the selected source color definition to at least one other instance of the source color for that object type. The predetermined criterion may include the following relationship: for each source color having at least two different source color definitions for the same object type, assigning the selected source color definition to all other instances of the source color for that object type. Alternatively, in the method, selecting one of the source color definitions may be accomplished by displaying the source colors having at least two different source color definitions and associated object types in a user interface; and responsive to input from a user, assigning a user-selected source color definition to all user-selected instances of the user-selected source color. Identifying any source colors having at least two different source color definitions may be accomplished by: for each object in the print job, transforming each object of the same object type using a prototypical color transformation; identifying sets of objects having source colors that match within a first tolerance level after the prototypical transformation process; for each set of objects having source colors that match, transforming each matching object's original source colors using a target printer's color space; and identifying any of the transformed colors of the matching objects within the set that do not match within a second tolerance level. The prototypical color transformation comprises an ICC-based profile.

A computer-implemented method of matching color elements for objects having different source color definitions within a print job prior to printing, in accordance with another embodiment, includes converting each object's source colors to a common color space; identifying groups of objects having source colors in the common color space that match within a first tolerance level; within each group of objects having matching source colors: transforming each object's original source color into a target printer's color space using the target printer's color transformation path; identifying any of the transformed colors of the matching objects within the group that do not match within a second tolerance level; if at least one of the transformed colors does not match the other transformed colors in the group, correcting mismatches within the group.

The method may further include displaying any groups of mismatched objects within a user interface; and responsive to user input for each group of mismatched objects displayed in the user interface, assigning a user-selected source color definition of the user-selected transformed color to all objects within the group. The method may also include modifying the target printer's color transformation path according to any relevant printer settings and print job parameters. In the method, converting each object's source colors to a common color space may be accomplished by converting each object's source color into a profile connection space (PCS) representation using a source ICC profile. Transforming each object's original source color into a target printer's color space using the target printer's color transformation path may be accomplished by converting the PCS representation to the common color space using an output profile. Correcting mismatches within the group may be accomplished by an algorithm (or by user input) which examines the objects within the group; determines if the objects in the group are intended to match one another in accordance with a predetermined criterion; and if not, removes those objects not intended to match from the group. Examining the objects within the group may be accomplished, for each object in the group, by examining that object's source colors, colors as expressed in the common color space and colors as expressed in the target printer's color space. The predetermined criterion used by the algorithm may be determining which objects in the group of are of the same object type. The method may be performed on a complete document, or alternatively, on a page-by-page basis.

In some cases two objects may have the same source color space and same color value, but transform into colors in the target printer space because of different rendering intents (which control, for example, the formulation of CMY vs K and the mapping of out-of-gamut colors into the printable gamut). In the case of DocuSP, the job or queue settings can cause different object types to be color converted using different rendering intents. This yields a possibly unexpected mismatch even though the document creator assigned two objects, say color text and a bar of a bar chart, the same source color. In some cases, even when a document is "fixed" by making all the source colors the same (as in the foregoing method), this does not fix the color mismatch when the job is printed using settings that assign different rendering intents to different object types. For example if the source colors were in fact already the same and the object type cannot be changed readily, the problem can be fixed by changing the chosen printer settings. In this case the method either: warns the users of the unfixable condition and instructs the user to change the printer settings, or in the alternative, automatically changes the printer's job settings in accordance with some predetermined criterion.

Disclosed in another embodiment herein is a method of color match verification, which may be implemented as a software tool operating on a computer or microprocessor, applied prior to printing that identifies color match problems arising from different color processing to be performed in the DFE/printer. The method in this embodiment accomplishes this by transforming each object's source color using a prototypical color transformation, identifying sets of objects whose colors match using the prototypical process, and then reconverting the source colors using the actual color transformation processing of the selected DFE/printer, and ensuring that the objects' colors still match. If they do not, they are included in a list on the user's display, including information that indicates why the items will not match when printed.

A computer-implemented method of identifying color mismatches for objects having different rendering intents within a print job prior to printing, may include identifying all objects within the print job, each object's type, each object's rendering intent and all source colors associated with each object; for each object in the print job, transforming each object's source colors using a prototypical color transformation; identifying sets of transformed objects having source colors that match within a first tolerance level after the prototypical transformation process; transforming all transformed objects using a target printer's color space; identifying any of the transformed objects in each set that do not match within a second tolerance level to form a group of mismatched objects; and displaying the group of mismatched objects in a user interface, wherein the display includes each object in the second set, all source colors and rendering intents associated with each object and information indicating which objects will not match when printed on the target printer.

A computer-implemented method of matching color elements for objects having different rendering intents within a print job prior to printing, may include identifying all objects within the print job, each object's type, each object's rendering intent and all source colors associated with each object; for each object in the print job, transforming each object's source colors using a prototypical color transformation; identifying sets of transformed objects having source colors that match within a first tolerance level after the prototypical transformation process; transforming all transformed objects using a target printer's color space; identifying any of the transformed objects in each set that do not match within a second tolerance level to form a group of mismatched objects; identifying any object types within the group of mismatched objects having at least two different rendering intents; for each object type having at least two different rendering intents, selecting one of the rendering intents in accordance with a predetermined criterion; and assigning the selected rendering intent to at least one other instance of that object type.

Some print jobs may be so complex that color mismatches may occur for multiple reasons. The foregoing methods can be combined. The method of matching color elements for objects having different source color definitions can be performed and selected source color definitions assigned to mismatching source colors for the same object type. Once objects of the same type have the same source color definitions, the method of identifying color mismatches for objects having different rendering intents can be applied. Objects with the same source color but different rendering intents can be identified and then either corrected automatically or displayed in a user interface for a user to correct.

Disclosed in other embodiments herein is a method for remote proofing a digital press by performing the color rendering of a specific DFE and printer, including taking into account job and printer settings, while maintaining vector objects. In one exemplary embodiment, this method color renders a file to a PDF/X-1a format to enable a portable proof-ready file, independent of the target print system. The PDF/X-1a's output intent tag identifies the intended print condition within the file. Adobe Acrobat can use this tag to convert colors from the print condition to the monitor space for soft proofing. Additionally, the rendered PDF/X-1a file can be sent to any device that supports the PDF/X standard and automatically convert colors from the output intent color space to the proofer color space for an accurate hard copy proof. This functionality automates and streamlines the proofing task of the end user because there is no need to find and load the correct ICC profile on the proofing system.

A method of proofing a print job to be printed on a remote printer, may include providing an input print job comprising a plurality of objects and remote printer settings; identifying all objects within the print job, each object's type, each object's rendering intents and all source colors associated with each object; for each object in the input file, transforming each object's source colors using the remote printer's color space; creating an output proof print job comprising the translated objects and an ICC profile corresponding to the remote printer; and outputting the output proof print job on a proofing device. The input print job may be formatted as a PDF file. The output print job may be output on a monitor or other printer. The color match methods described above may be applied during the transforming steps.

A method of proofing a print job to be printed on a remote printer, may include providing an input print job comprising a plurality of objects and remote printer settings; identifying all objects within the print job, each object's type, each object's rendering intents and all source colors associated with each object; for each object in the input print job, transforming the object's color to the target printer's color space, using the target printer's actual color conversion process, taking into account printer settings, job ticket, and media to produce a document having colors that are represented in the target printer's device CMYK color space; converting the document to PDF/X-1a format, including tagging the document with an output profile corresponding to the target printer; sending the resulting PDF/X-1a file to a PDF/X-1a compliant output device.

In the foregoing method for matching color elements for objects having different source color definitions and method for matching color elements for objects having different rendering intents, matching is done by computing color distance and clustering. This may be accomplished by calculating the difference between color objects in a document, where the difference is defined by rendering the objects through a "standard" SWOP path and contrasting that data with the rendering through an Object Optimized Rendering (OOR) path. These methods generate a large amount of data in both the automatic mode and for the user interaction mode. In some instances, it may be useful to filter the data generated using the foregoing methods. It may be useful to redefine the color match problem used in the foregoing method in order to reduce the number of returned mismatched objects. It may also be useful in the user interaction embodiment to provide additional relevance criteria that are based on other object properties than the described and measured color properties.

Disclosed herein in yet other embodiments is a computer-implemented method of matching color elements for objects having different source color definitions within a print job prior to printing, including: for each page in the print job, identifying all objects within the page, each object's type, each object's color space, each object's rendering intent and all source colors associated with each object; identifying, according to a predetermined problem criterion, any problem objects within the page requiring color matching; for each problem object, identifying any source colors having at least two different source color definitions; for each source color having at least two different source color definitions, selecting one of the source color definitions in accordance with a first predetermined criterion; and assigning the selected source color definition to at least one other instance of the source color for that object type. The method may further include for each object type, identifying any problem objects having identical source color definitions and different rendering intents; selecting one of the rendering intents in accordance with a second predetermined criterion; and assigning the selected rendering intent to at least one other instance of that object type. The predetermined problem criterion may include eliminating objects satisfying selected parameters of size, type and color space and spatial proximity, and in any order.

A computer-implemented method of matching color elements for objects having different source color definitions within a print job prior to printing, according to another embodiment, may include for each page in the print job, identifying all objects within the page, each object's type, each object's color space, each object's rendering intent and all source colors associated with each object; identifying, according to a predetermined problem criterion, any objects within the page requiring color matching; for each problem object, identifying any source colors having at least two different source color definitions; for each source color having at least two different source color definitions, displaying the source colors having at least two different source color definitions and associated problem objects in a user interface; and responsive to input from a user, assigning a user-selected source color definition to all user-selected instances of the user-selected source color.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Various methods will be described for ensuring that the individual elements of a document to be printed that match in color will match in the printed document. In the following description, these methods will be described as implemented in software tools operating on a computer system, which sends print jobs to an output or target printer. Some of these tools can be configured to automatically make mismatching colors match in accordance with some predetermined criterion. Others of the methods will provide the mismatching colors in a user interface for the user to select which, if any, colors to match. Indeed, even in the user interface implementation, some users may elect to have the method automatically match colors.

A first method can be used to correct for color mismatch problems arising from different color processing for different source color representations. In this method, colors of objects in the document are analyzed for mismatches, then corrected. For each object in the document (excluding sampled images), the object's colors are converted to a common color space using a simple, ICC-based approach. That is, the source color is converted into a profile connection space (PCS) using a source ICC profile, and then the PCS representation is converted to the common color space using an output profile, e.g., a printer profile. Objects in the document may be then clustered into groups or sets that have matching colors in the common space. Matching is determined according to some first tolerance range by comparing the color values generated as a result of the transformation for the particular objects. If the numeric values are within the first tolerance range, the colors are deemed to match.

In one embodiment, matching is done by computing color distance and clustering. Color distance is computed as Euclidean distance (square root of the sum of squares of the component differences) in the common color space. An alternative would be to further convert the color from the common space to a visually uniform space such as CIE $L^*a^*b^*$, and then compute Euclidean distances in the visually uniform space. Distance is computed between cluster centroids. A cluster's centroid is the average of the member objects' components, with each object weighted equally. An alternative would be to weight each object by an attribute such as area of ink coverage. Clustering is done as follows: Initially each object is the sole member of a cluster. For every cluster the distance to its nearest neighbor is computed. Repetitively the two nearest clusters are merged into one, the new cluster's centroid determined, and all affected nearest neighbor distances updated. Repetition terminates when the nearest cluster distance exceeds a specified threshold. The clustering does not involve interaction with the user.

Within each group, each object's original source color is transformed into the target printer's color space using the actual color transformation path of the DFE for that printer, taking into account any relevant printer settings and job ticket parameters. If the colors of the objects within a group, as expressed in the target DFE/printer's color space, do not all match within a second tolerance range (i.e., their output color values after the second transformation are not within the second tolerance range), the method will either correct the mismatch automatically using a predetermined criterion or display all of those objects in a list of mismatches in a user interface for the user to correct manually. The method can be applied to the entire document or on a page-by-page basis.

One example of a predetermined criterion for matching mismatching colors is for each source color having at least two different source color definitions for the same object type, assigning a selected source color definition to all other instances of the source color for that object type. This criterion ensures that all objects of a particular type will have the same source color definition and be processed the same.

Figure 1:
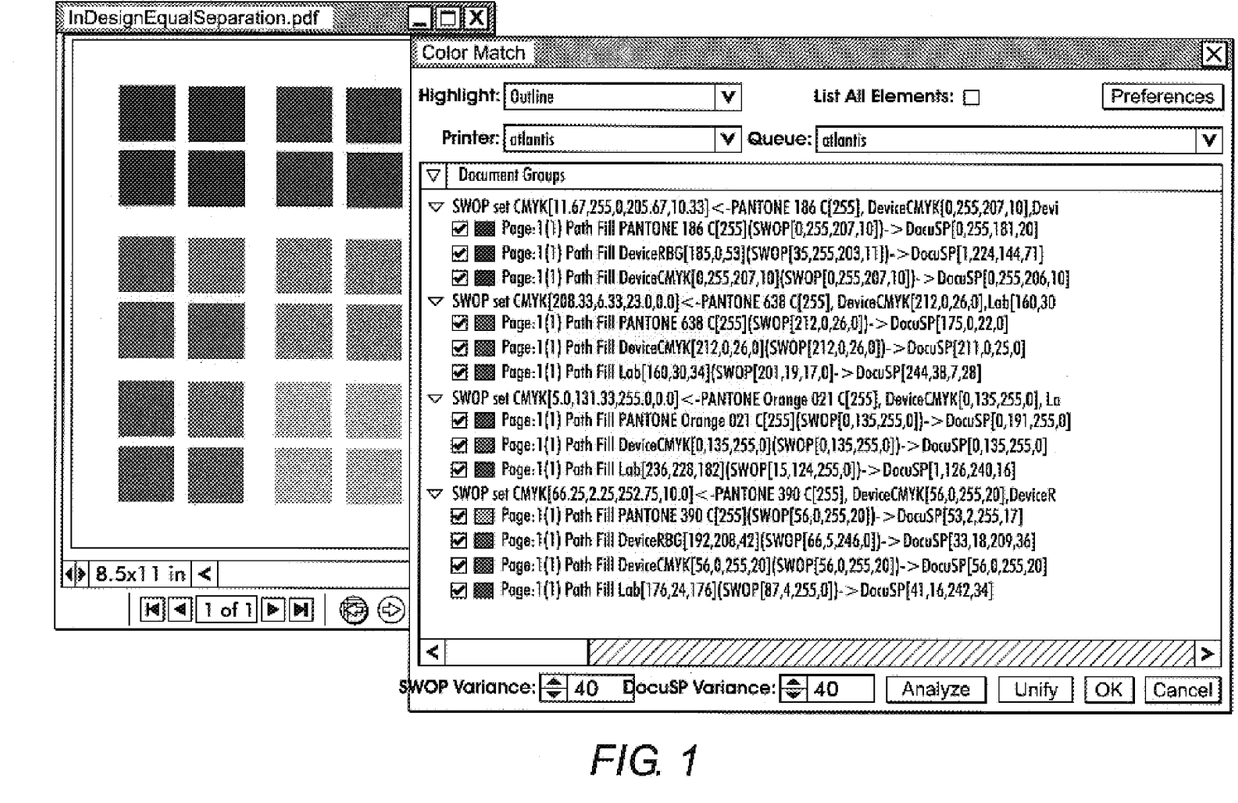
FIG. 1 illustrates a user interface displaying groups of color mismatches.

Not all users will want to have source color definitions set by default for all objects of a particular type. In this case, the method will display mismatches in a user interface. FIG. 1 illustrates a user interface which shows various groups of objects that have been analyzed using this method. A document on the left shows a series of six groups of source colors, each having four instances. Results of analysis according to the method are displayed on right, showing four groups of color mismatches. Each line describing each mismatched object includes a representation of the object's color as expressed in the target space, the page in the document on which the object was found, the object type, source color, common color (SWOP CMYK in this case) and target color (DocuSP CMYK in this case). Note that in FIG. 1, each object's color has a different color value.

For each mismatch group, the user examines the objects listed, including their source colors, colors as expressed in the common color space, and colors as expressed in the DFE/printer's native color space, and determines if the objects in the group were intended to match each other. Objects that were not intended to match are deselected. The user then selects one of the objects in the group whose source color representation is what all of the objects in the group should have been, and clicks a "unify" button. The tool writes the source color of the selected object into the color property for all of the objects. (Alternatively, some other source color chosen by another means may be used for the unification process.)

Figure 2:
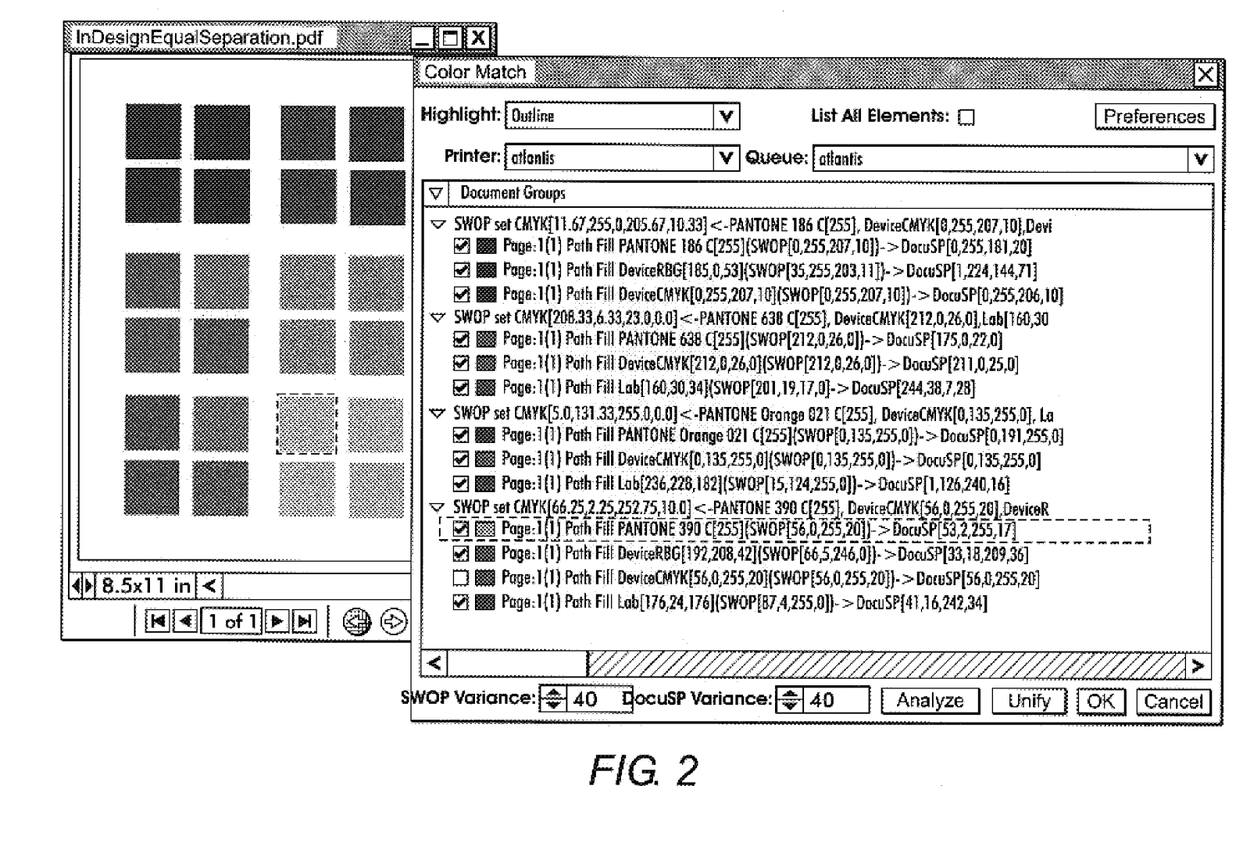
FIG. 2 illustrates a user interface displaying groups of color mismatches with one item deselected.

FIG. 2 shows a group of objects with one member deselected, and one member highlighted as the exemplar for unification. Color group with DeviceCMYK object deselected (second from bottom in list; note unchecked checkbox) and PANTONE object highlighted for unify. The highlighted object is also indicated by a dashed line in the document view at left. When the user clicks the "Unify" button the three checked-marked lime green objects will all have their color definitions changed to the same PANTONE color as the highlighted object.

A software tool implementing the above-described method was implemented in a plug-in which may be installed in Adobe Acrobat. The following illustrates the installation and operation of this tool. Operation: Correct installation of the tool results in a new "XeroxTools" menu appearing on the main menu bar in Acrobat. Two tools are provided: ColorMatch and Remote Proof. Although either of the plug-in tools may be opened before opening any document, a document must be opened in Acrobat before either of these tools may be run.

Color Match. The purpose of the Color Match tool is to help a user find and fix problems with color matching within a document. It goes through a two-step process analyzing the user's document. If the user has installed the printer data files at the default location, then the tool will open immediately. Otherwise, the user will be prompted to locate the DocuSP directory on the disk, which contains the printer data files.

Finding Problems. In the first step, all objects in a document are translated into Acrobat's Working CMYK space (e.g., SWOP Coated), and grouped into sets of objects that match within the specified variance. In the second step, all of the objects in each matching group are translated into DocuSP CMYK using the printer and queue settings selected by the user. Objects that matched in the first step (i.e., in the default CMYK space), but do not match in the second step (i.e., in the DocuSP color) are shown in the tool. For each object, the object type, source color (both stroke and fill), and corresponding standard and DocuSP CMYK colors are shown in a mismatch list in the large box in the center of the plug-in tool. When the user selects the list entry, the corresponding object in the document is centered in the document window, and the object is highlighted in the manner selected by the "highlight" menu (one of Outline, Invert or Flash). This makes it easy to determine which object the tool has flagged.

Example of Clustering Algorithm. Consider a test file which consists of 4×4-bluegrey-0+4+8+12.pdf with variances 16, 18, 20, 40 in a PDF format document. The PDF document content is enumerated by the facilities of the Adobe PDF Library package. The items under examination are instances of the abstract superclass PDEElement, which encompasses many types of object including PDEPath, PDE-Text and PDEShading, the only types of interest to ColorMatch, as well as many others such as PDEImage and PDEXObject, which are ignored.

In each instance of PDEPath encountered, as many as two color values are possible, the stroke color and the fill color. Each instance of PDEText may contain one or more text runs; each text run may specify a stroke color value and/or a fill color value. Each PDEShading is treated as specifying two color values, if it is an Axial or Radial shading, or four color values, if it is a Function-Based shading; the other types of shading are not supported. Each non-null color value is added to ColorMatch's data base of document color values.

A color value, called a PDEColorSpec by Adobe, consists of a color space and its requisite tint values. In Adobe Acrobat's formulation there are eleven color spaces: three device spaces DeviceGray, DeviceRGB and DeviceCMYK; four CIE-Based spaces CalGray, CalRGB, Lab and ICCBased; and four special color spaces Pattern, Indexed, Separation and DeviceN. The device spaces are simple uncalibrated spaces of one, three and four components respectively. The calibrated CIE-Based spaces CalGray, CalRGB and Lab consist of one, three and three components respectively; an ICCBased space may require one, three or four component values. A Separation space is a spot colorant and a tint, or amount of colorant; a DeviceN space is a blend of one or more spot colorants and their tints. An Indexed color space uses a small integer component value to index a table of arbitrary color values specified in another color space. A Pattern space is either a Tiling, which replicates a fixed bounded image over a grid, or a Shading, which sweeps a varying color value across a region of the document; Pattern space values do not fit the model (space & component values) applicable to other color spaces. ColorMatch currently supports all possible cases except Tiling Pattern spaces and the four Mesh Type Shading Pattern spaces.

ColorMatch's data base of document color values is organized as a collection of sets of objects. Each set, called a ColorSpecSet, is distinguished by a specific PDEColorSpec and a specific rendering intent, which can be either Graphic, used for paths and shadings, or Text. The objects in a particular set are instances of PDEElement which share the set's distinguishing PDEColorSpec and intent. Usually each ColorSpecSet will have unique distinguishing values and contain all elements matching those values, but, if the PDF document is not structured optimally, it is possible for two or more sets to have identical distinguishing values, in which case the sets will be disjoint, that is each object will be a member of one set only. Most further processing is focused upon the ColorSpecSets acting as proxy for the contained elements.

The next step of the analysis begins with the transformation of each ColorSpecSet's color value to Acrobat's CMYK Working Space, which is specified in Acrobat's Color Management Preferences dialog and which defaults to "U.S. Web Coated (SWOP) v2". Hereafter in this document that transformed value will be referred to as the SWOP value although the actual Working Space might be another CMYK space. Then the data base is further organized into a collection of sets of ColorSpecSets. Each set, called a SWOPcolorSet, is distinguished by a unique SWOP value and, at this stage of the analysis, each set contains all ColorSpecSets exactly matching its SWOP value, and no others.

Next, if the user has specified a nonzero SWOP Variance, SWOPcolorSets with sufficiently similar SWOP values are merged. Initially each SWOPcolorSet contains ColorSpecSets with one identical SWOP value. The clustering algorithm iteratively merges the nearest two SWOPcolorSets. The separation between SWOPcolorSets is a simple Euclidean distance in CMYK space. The location of each SWOPcolorSet is its centroid, a weighted average of the individual ColorSpecSet SWOP values, weighted by the number of PDF elements in each ColorSpecSet. (A more ambitious calculation might weight elements by a more complex criteria such as amount of ink coverage.) The clustering algorithm terminates when the nearest two SWOPcolorSets are more distant than the user-specified SWOP Variance.

Upon completion of this clustering process, each SWOPcolorSet is distinguished by a SWOP value at the centroid of the set's members, and each set contains all ColorSpecSets whose SWOP values fall within a spherical region of radius specified by the SWOP Variance and centered at the centroid.

Fixing Problems. The ColorMatch plug-in provides a way to alter the PDF file so that all objects within a color group have the same source color. This feature is called unify. To use Unify, the user selects one of the objects in a color group, and clicks the Unify button at the bottom of the tool. The source color from the selected object becomes the source color for all the checked objects in that group. Since the objects now match in color, they are removed from the mismatch list. If the user does not want the new source color to be applied to certain of the objects in the set, simply uncheck the checkbox at the left end of the list entry for that object. The PDF document will be updated when the user clicks the tool's "Unify" button. Even after the user has "Closed" the tool, the altered document has not been saved back to the disk. The user can save the document, overwriting the original source colors, or the user can "Save As" to a new name, if the user wishes to preserve the original document.

Figure 4:
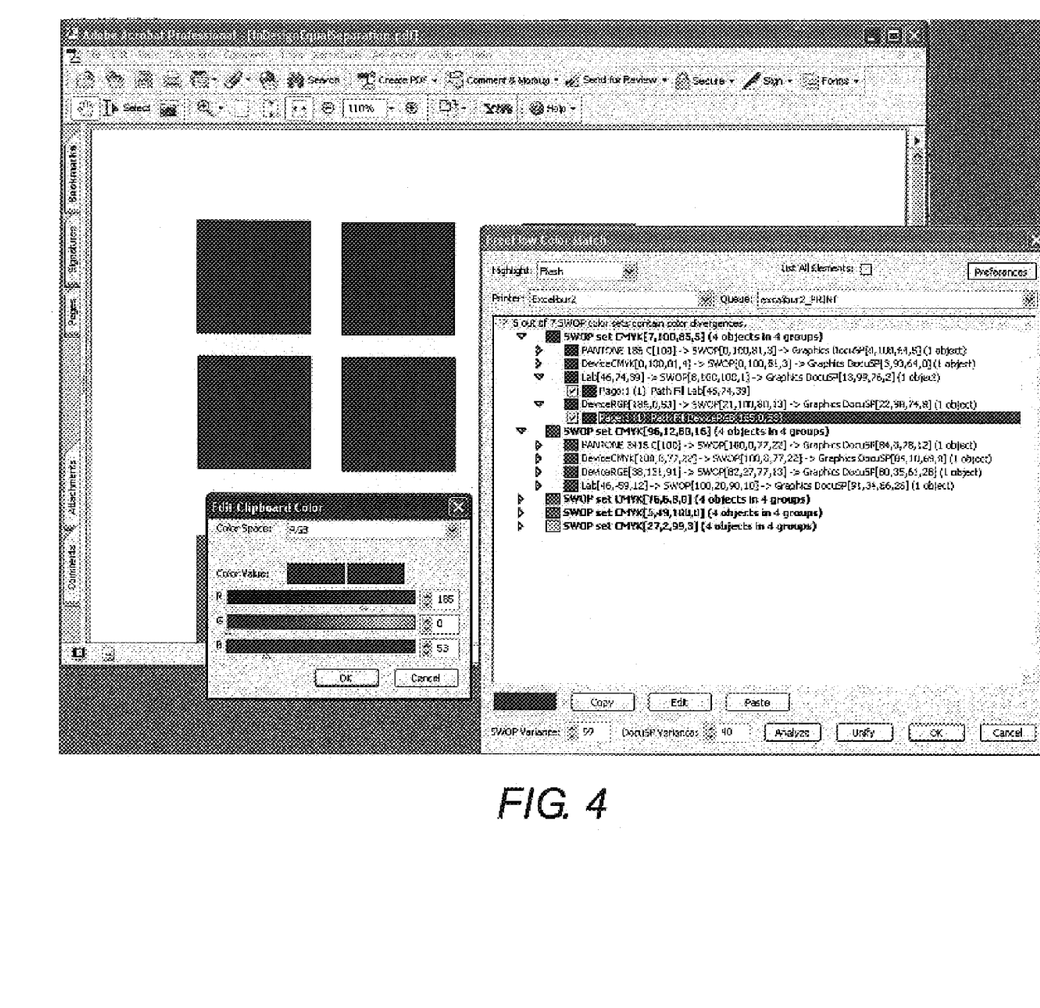
FIG. 4 illustrates another user interface displaying an additional window for editing source color definition.

Color Editor. If none of the original objects has the desired color, this version of ColorMatch now supplies a color editor. Select the object whose color is to be modified and click the "Edit" button beneath the list of objects. A color editor will appear, which allows the user to modify the components of the source color (or select from a list of spot colors known to the selected target printer, in the case of a source spot color) as shown in FIG. 4. The user can also convert the source color to either SWOP CMYK or the target printer's CMYK. The user can also revert to the source color by selecting "Original" from the color space drop-down menu. Clicking "OK" updates the color of the "inkwell" on the main ColorMatch window. The user can now select any object and click "Paste" to update that object's color. If the user merely wants to copy the color of an object from one group into another group, the "Copy" button beneath the object list will copy the color of the selected object into the "inkwell" without opening the color editor.

Remote Proofing. The Remote Proofing tool color converts the text and graphic objects in a PDF document to DocuSP CMYK and produces a PDF/X-1a file with an embedded printer-specific ICC profile. The ICC profiles currently embedded are for the iGen3, DC 2060, or DC 6060 printers. There is currently only one ICC profile per IOT available. To produce a remote proof PDF document: Choose Xerox Tools>Remote Proof. Select a Printer. Select a Queue. Click the Create Proof button. A new PDF/X-1a document will be created. "x1a" will be appended to the new document's file name. The file can then be sent to a PDF/X-1a compliant proof printer. Note: If the document has security features enabled, the Remote Proof tool will prompt for a password before it can produce the proof document. The new proof document will not inherit the security features of the original.

Note: If the fonts in the original document are not embedded or if the original document has actions, transparency, or separated pages, the file that will be produced will not be PDF/X-1a compliant. The tool currently detects these cases and alerts the user. Other requirements for PDF/X-1a compliance that the tool does not currently check for are: No LZW compression; Page boxes must be nested properly; Halftone must be Type1 or Type5; No Halftone Name key; No HTP key within an ExtGState resource; No embedded PostScript; Alternate image not default for printing; Annotation and Acrobat form elements must be outside of Trimbox and Bleedbox; No Javascript; No operators not defined in PDF 1.3; No File Specifications—typically used for OPI comments as well as external streams; and No OPI in Form Xobject or Image Object.

A second method can be used to correct for color mismatch problems arising from non-color differences in the source (e.g., differing object type) causing objects to take different color transformation paths. One example of is when the DocuSP color DFE assigns different ICC rendering intents to different object types. In the method, for each object in the document (excluding sampled images), the object's colors are converted to a common color space using a simple, ICC-based approach. That is, each source color is converted into a profile connection space (PCS) using a source ICC profile, and then the PCS representation is converted to the common color space using an output profile, e.g., a printer profile. All objects are then clustered into groups or sets having colors that match in the common space to within some tolerance range. Within each group or set, each object's original source color is then transformed into the target printer's color space using the actual color transformation path of the DFE for that printer, taking into account all relevant printer settings and job ticket parameters. If the colors of the objects within a group, as expressed in the target DFE/printer's color space, do not all match within a second tolerance range, display all of those objects in a list of mismatches. Color matching is determined by comparing output color values generated by the particular transformation. Alternatively, the first transformation may be eliminated and clustering can be performed independently in each represented color space.

Figure 3:
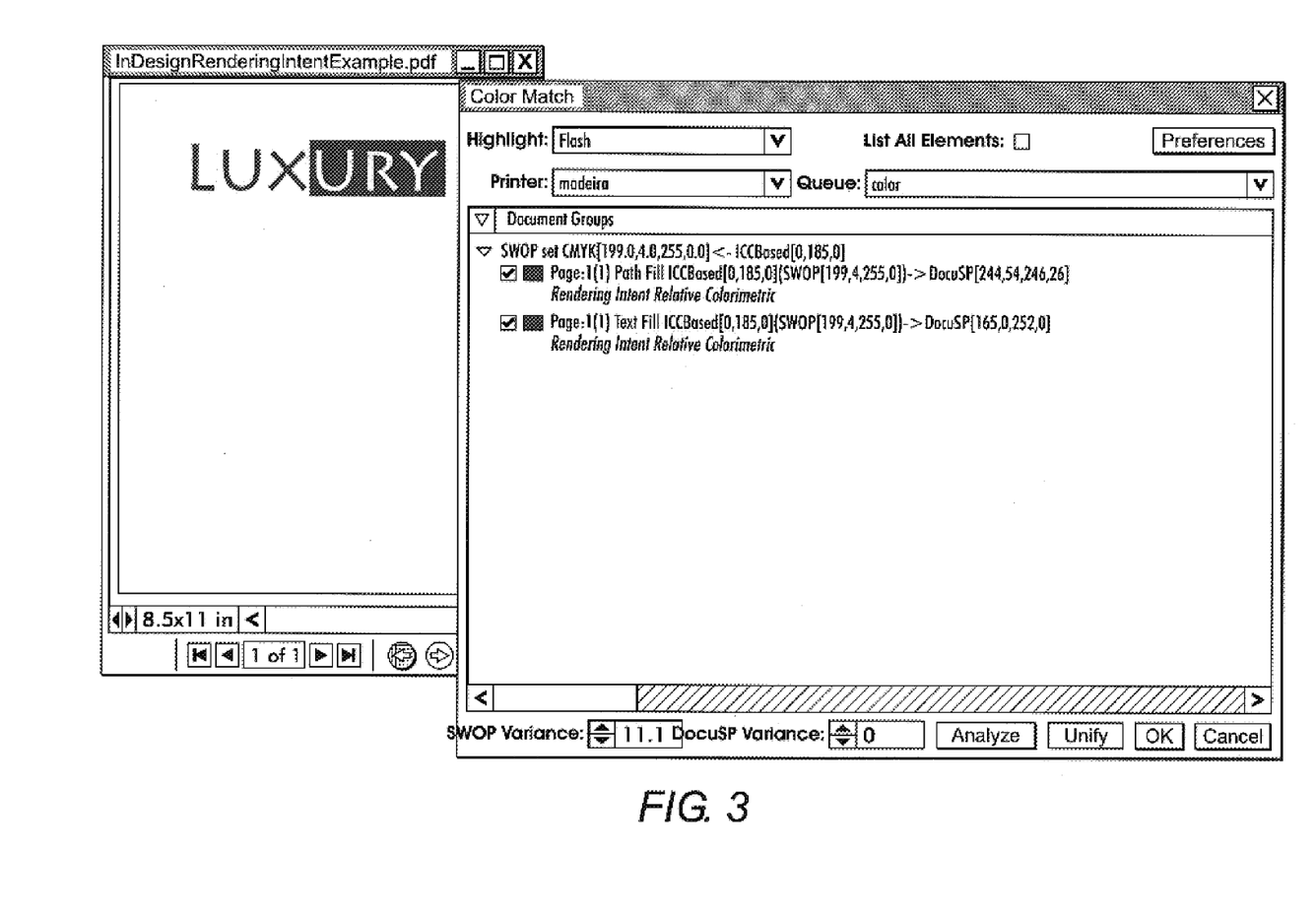
FIG. 3 illustrates a user interface displaying results after analysis of mismatches based on rendering intents.

FIG. 3 illustrates a user interface which shows various groups of objects that have been analyzed as described. Document to be analyzed is shown at left. Results of analysis on right, showing one group of color mismatches, consisting of two objects. The line describing each mismatched object includes a representation of the object's color as expressed in the target space, page on which the object was found, the object type, source color, common color (SWOP CMYK in this case) and target color (DocuSP CMYK in this case). A line of warning text beneath the line for each object shows in red the reason for the mismatch, in this case a difference in rendering intent. Note that in FIG. 3, each object has the same color value.

For each mismatch group, the user examines the objects listed, including any warnings, and determines if the objects in the group were intended to match each other. The user then corrects the problem causing the mismatch, e.g., by changing the printing settings (the DocuSP queue in this example). As workflow systems become more tightly integrated, e.g, with JDF, the tool may provide a means to directly change the printer settings via the job ticket.

Remote proofing enables a user to view locally a print job that will be submitted to a remote printer, such as a production printer like Xerox Corporation's iGen3, DocuSP, DC 2060 and DC 6060. This is similar to the process used by photographers: a proof set of photographs is sent to a customer for selection before printing the photographs in final form using the best quality paper and processes. A method for remote proofing a digital press performs the color rendering of a specific DFE and printer, taking into account job and printer settings, while maintaining vector objects. In one exemplary embodiment, this method color renders a file to a PDF/X-1a format to enable a portable proof-ready file, independent of the target print system. The PDF/X-1a's output intent tag identifies the intended print condition within the file. Adobe Acrobat can use this tag to convert colors from the print condition to the monitor space for soft proofing. Additionally, the rendered PDF/X-1a file can be sent to any device that supports the PDF/X standard and automatically convert colors from the output intent color space to the proofer color space for an accurate hard copy proof. This functionality automates and streamlines the proofing task of the end user because there is no need to find and load the correct ICC profile on the proofing system.

PDF/X-1a is a new file format, intended for the reliable exchange of graphic arts data. PDF/X-1a offers additional security for files that are submitted remotely. Fonts and images must be embedded, eliminating the possibility of font substitution or missing elements. Color must be CMYK. Mechanical specifications (media, trim etc.), trapping and print conditions (such as SWOP) must be defined, so there is far less margin for error. The PDF/X-1a standard addresses blind exchanges where all files should be delivered in CMYK (and/or spot colors), with no RGB or device independent (color-managed) data. This is a common requirement in many areas around the world and in many print sectors—usually tied to an environment where the file supplier wants to retain maximum control of the print job. It's very hard to transmit data as RGB or Lab and still to include custom trap definitions, for instance. The first PDF/X-1a standard, better referred to as PDF/X-1a:2001 is published as ISO standard 15930-1:2001.

For each object in the document, convert the object's color to the target DFE/printer's color space, using the actual DFE/printer's actual color conversion process, taking into account printer settings, job ticket, and media. This conversion produces a document whose colors are all represented in the target printer's device CMYK color space. Convert the document to PDF/X-1a, which includes tagging the file with the output profile corresponding to the target printer. Send the resulting PDF/X-1a file to a PDF/X-1a compliant soft proofing system or hard proofing device.

Structurally, "RemoteProof" may be implemented as a separate tool, but sharing many of the same software components as the "ColorMatch" Acrobat plug-in described above. In particular, the color conversion extracted from the DocuSP DFE is used heavily by both RemoteProof and ColorMatch. Likewise, the same code may be used to access each object in the PDF file, although what is done with each object differs between the two tools.

Functionally, a user would interact with RemoteProof as follows. In the method of remote proofing, an input PDF file is opened. The file is checked for compatibility with the PDF/X-1a standard, and warnings for non-compliant features are generated. For each object in the file: the source color is translated to the specified device output color space using the full sophistication of the DFE's color conversion. This conversion may include automatic selection of different rendering intents based on object type, custom spot color dictionaries (e.g., for best Pantone compliance), etc. The object that has been color-translated is reinserted into the PDF file in place of the original object. For objects of compound color, for example smooth shading and sampled images, each source color involved in specifying or defining the compound color is translated. An ICC profile corresponding to the targeted output color space is attached to the PDF file. The file is marked as a PDF/X-1a file, unless there are compliance issues. RemoteProof may be implemented as an element of an automated workflow, although an Acrobat Plug-in version implemented is invoked manually by a user.

A purpose of Remote Proofing is to enable proofing of the effects of the full DFE conversion on a proofing device (either monitor or proof printer) other than the targeted printer. For example, a graphical design house may be targeting a document to an iGen3, but the design house does not have one at their design house so they outsource the printing to a commercial printer who has the iGen3. How do the designers see what the output is going to look like? RemoteProof can be used to convert the document to iGen3 CMYK, and use an ICC "device link" profile of a CMYK proof printer, along with the profile specifying iGen3 CMYK that RemoteProof embedded in the PDF/X-1a file it generated, to produce a proof print that mimics the iGen3, including the DocuSP color conversion, to the limits of the proof printer's gamut.

Referring again to FIG. 1, there is shown a typical information screen for a method of color matching based on different source color definition. In essence, all document objects are listed and the corresponding color values are given in various color spaces. This method is essential to a color expert who wants to assure that everything in the document is in order. At the same time, a novice user, or a less skilled user is overwhelmed by the amount of information. This problem and a solution is analgous to AIE (automatic image enhancement) and PhotoShop.

PhotoShop is clearly the "better" Expert tool, allowing the fine-tuning of all image parameters. AIE on the other hand is fully automatic. This allows a trade-off between "perfect quality using expert intervention" and "good quality with simple intervention". This trade-off is often application dependent. It is important to note that even experts use automatic systems in cases where the cost of expert time would outweigh the quality benefit of expert intervention. For example, the time spent on a publication that has a run of 200,000 can be much larger than the time spent on a run of 20. Disclosed herein in embodiments is a method for color matching that can be used by non-experts and in scenarios of short runs.

Color problems in offset transfer result predominantly from Object Oriented Rendering (OOR) and thus can all be eliminated by avoiding OOR and using SWOP emulation: switch OOR off. However, this is not a good approach, since it might lower image quality by a large amount (that is why OOR was invented). In those cases where the cost of expert time outweighs the quality benefit of using the expert user methods described above, the number of objects analyzed can be reduced; i.e., the method filters the objects on a page-by-page bases to leave a smaller group of problem objects. Color analysis is then limited to those problem cases either automatically or via display and user intervention. For purposes of this method, all pages of the print job are considered separately. Thus no comparison is made across page boundaries, reducing the number of mismatched objects to be displayed to a user considerably. There are only a few realistic cases where this restriction should be eliminated, but they can easily be handled as described below.

Problem cases can easily be identified from a small number of different parameters, such as for example, size, object type, color space and spatial proximity. Assuming a filtering process in the same order as described, first eliminate all small objects inside the document from analysis. Small object might include all text (unless the text is well above normal reading font size of 12 pt), all isolated lines (not overlapping or touching), etc. For simplicity a size less than about 1 cm (0.5 inch) can be used as the threshold for small, but it is understood that this can be a user configuration setting. Object size can be, for example, either directly calculated from the current transform matrix or by rendering the data in a low resolution buffer using z-order indication, or some other methodology. Object proximity can be calculated in the same manner. It should be understood that the foregoing filtering process may proceed based on a single parameter or on a combination of parameter efficiencies and the ease in which the parameter may be obtained from the data file. Filtering may occur in any order, the foregoing order being only for illustration.

Figure 5:
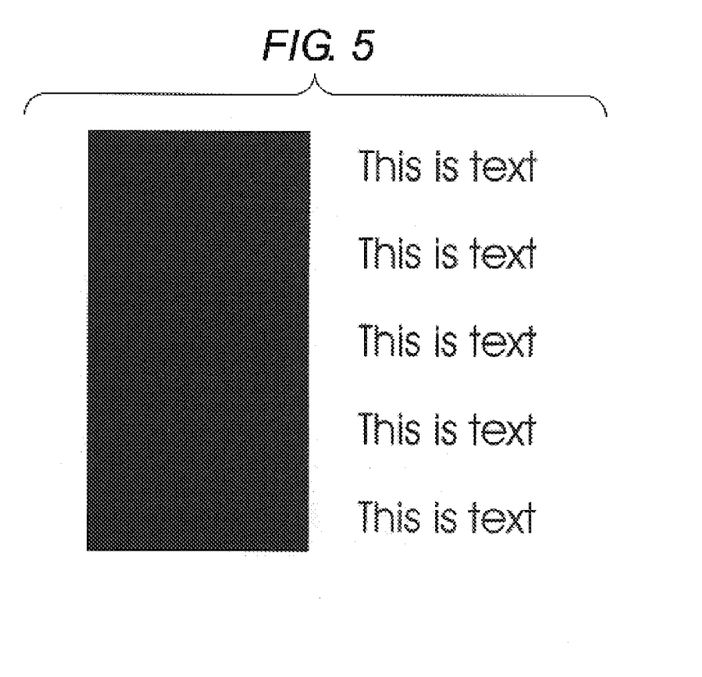
FIG. 5 illustrates a large fill area adjacent to small object.

A simple example can be seen in FIG. 5. In FIG. 5, a solid fill rectangle is in close proximity to several lines of small text (12 pt). All text lines have a different color and only one of the lines matches the color of the rectangle. For an observer, however, it is nearly impossible to identify the "correct" line unless slow and close examination is performed. From FIG. 5, it is can be seen that small objects do not need to be considered for an automatic color matching method version (they still might be important in the expert methods described above). Filtering or eliminating small text objects from the analysis dramatically reduces the number of objects that are maintained for further color matching.

Figure 6:
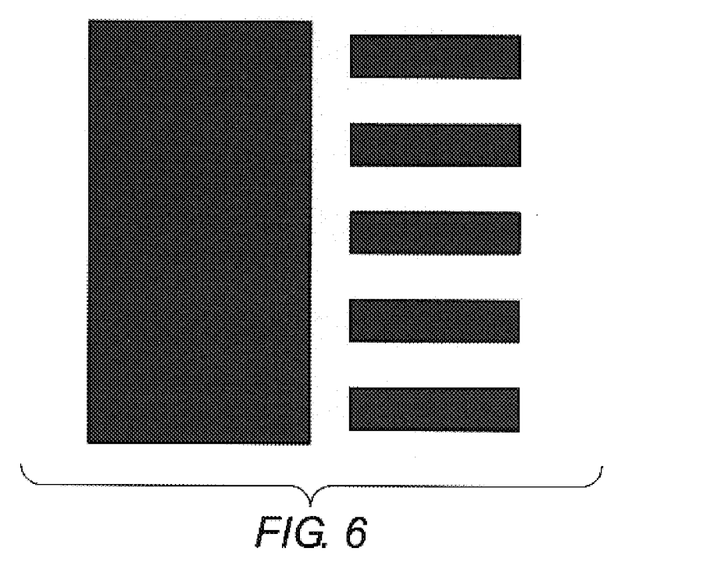
FIG. 6 illustrates non-touch objects having a stroke or outline.

In the next filtering step, the document page is filtered by object type and color space. Here all pictorial (image data) objects are ignored except those that touch graphics objects. Also, all graphics objects are eliminated if outline (stroke) and fill color are different unless they touch other objects. An example of this is shown in FIG. 6, in which five smaller graphic objects having a stroke or outline are shown in proximity to, but not touching, the larger fill graphic.

In the next step, all graphics objects that have a common color space are eliminated (i.e., if all graphics objects on a page have the identical color space, only objects touching other object classes are not eliminated). For the purpose of this method, color spaces can be considered identical if they can uniquely be transformed into one another (e.g., Lab is thus equal to XYZ, but not to CMYK).

In the next step, all graphics objects that are separated by more than a specific distance (say 1 inch) are eliminated.

At this stage, only very few objects are left for examination. Touching objects of different object class or color space (e.g., Lab, SWOP, Pantone) remain. At least one object is of a non-image class (graphics, large text). Non-image objects of a minimum size with a minimum separation of differing object class or color space also remain. These objects may now be analyzed using the method of matching color elements for objects having different source color definitions and/or the method of matching color elements for different object types having different rendering intents described above.

The foregoing filtering process can be used to define a fully automatic color match tool. First all filtering is done as described above, resulting in a small number of possible conflicts. It is important to understand that the possible problem objects are a small subset of all objects of the document. This in turn means that all un-marked objects can be rendered using OOR and thus with highest possible quality. It has to be remembered that only objects within a certain color accuracy of each other will be flagged, so a red square (graphics object) on a blue circle (graphics object) will not be flagged. Also, black/white objects can be identified as "blank space" between objects. Secondly, in fully automatic mode, all objects are rendered in the non-OOR mode (normally SWOP emulation) avoid conflicts. A fully automatic system can solve the vast majority of color adjustment problems (using an AIE-like philosophy). At the same time, it also can be used to indicate the problems to a "average user" by concentrating on a few visually obvious cases.

Migrating from Intra-page to Inter-page Matches. There are only a few cases, where an inter-page match is relevant for an automatic or semi-automatic process (they still might be relevant in the expert mode). The first case is a recurring element on every page, e.g., a Company Logo. However, this case is easily handled. If no individual page flags the Logo as a problem, then the Logo is simply rendered as is, since inclusion is either by data replication or by reference and thus Logo color consistency is achieved automatically. If one of the pages indicates the Logo as a potential problem due to proximity with a different object some simple rules can be applied. In modifying one of the objects (in order to achieve the match either rendering or color have to be modified) always modify the un-referenced/not-reused object. The second case is that of a multi-page spread where different objects cover multiple pages that—after binding—appear attached. This problem is simply remedied by using a modified page definition in the analysis. Assuming that imposition is known (meaning that the page numbers are a reflection of actual page order), facing pages can be re-defined to be a single page for the purpose of the analysis and all previously described methods simply apply.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer-implemented method of identifying color mismatches for objects having different rendering intents within a print job prior to printing, comprising:
   identifying all objects within the print job, each object's type, each object's rendering intent and all source colors associated with each object;
   for each object in the print job, transforming each object's source colors using a prototypical color transformation;
   identifying sets of transformed objects having source colors that match within a first tolerance level after the prototypical transformation process;
   transforming all transformed objects using a target printer's color space;
   identifying any of the transformed objects in each set that do not match within a second tolerance level to form a group of mismatched objects; and
   displaying the group of mismatched objects in a user interface, wherein the display includes each object in the second set, all source colors and rendering intents associated with each object and information indicating which objects will not match when printed on the target printer.

2. The method of claim 1, wherein the prototypical color transformation comprises an ICC-based profile.

3. The method of claim 2, wherein transforming each object's source colors using a prototypical color transformation comprises converting each source color into a profile connection space (PCS) using a source ICC profile; and
   converting the PCS representation to a common color space using an output profile.

4. The method of claim 3, wherein the output profile comprises a printer profile associated with the target printer.

5. The method of claim 1, wherein transforming all transformed objects using a target printer's color space comprises:
   within each set, transforming each object's original source color into the target printer's color space using the actual color transformation path of the DFE for the target printer, taking into account all relevant printer settings and any print job ticket parameters.

6. A computer-implemented method of matching color elements for objects having different rendering intents within a print job prior to printing, comprising:

identifying all objects within the print job, each object's type, each object's rendering intent and all source colors associated with each object;

for each object in the print job, transforming each object's source colors using a prototypical color transformation;

identifying sets of transformed objects having source colors that match within a first tolerance level after the prototypical transformation process;

transforming all transformed objects using a target printer's color space;

identifying any of the transformed objects in each set that do not match within a second tolerance level to form a group of mismatched objects;

identifying any object types within the group of mismatched objects having at least two different rendering intents;

for each object type having at least two different rendering, selecting one of the rendering intents in accordance with a predetermined criterion; and assigning the selected rendering intent to at least one other instance of that object type.

7. The method of claim 6, wherein the prototypical color transformation comprises an ICC-based profile.

8. The method of claim 6, further comprising assigning the selected source color definition to all instances of the source color within the print job.

* * * * *